(12) United States Patent
Wittmer et al.

(10) Patent No.: US 7,259,848 B2
(45) Date of Patent: Aug. 21, 2007

(54) PROCESS MEASURING POINT

(75) Inventors: Detlev Wittmer, Maulbronn (DE); Wolfgang Babel, Stradt (DE)

(73) Assignee: Endress + Hauser Conducta Gesellschaft fur Mess-und Regeltechnik mbH + Co. KG, Gerlingen (DE)

(*) Notice: Subject to any disclaimer, the term of this patent is extended or adjusted under 35 U.S.C. 154(b) by 223 days.

(21) Appl. No.: 10/481,402

(22) PCT Filed: Jun. 25, 2002

(86) PCT No.: PCT/EP02/07008

§ 371 (c)(1),
(2), (4) Date: Sep. 17, 2004

(87) PCT Pub. No.: WO03/002958

PCT Pub. Date: Jan. 9, 2003

(65) Prior Publication Data

US 2005/0046838 A1    Mar. 3, 2005

(30) Foreign Application Priority Data

Jun. 28, 2001  (DE) .............................. 101 30 862

(51) Int. Cl.
*G01J 3/42* (2006.01)
*G01N 21/01* (2006.01)
*G01N 21/85* (2006.01)

(52) U.S. Cl. ........................................ 356/319; 356/436

(58) Field of Classification Search ................ 356/436, 356/319–330
See application file for complete search history.

(56) References Cited

U.S. PATENT DOCUMENTS 4,177,676 A * 12/1979 Welker ........................ 73/198

(Continued)

FOREIGN PATENT DOCUMENTS

DE    44 14975 A1    11/1995

(Continued)

OTHER PUBLICATIONS

Schwab et al., Versatile, Efficient Rama Sampling with Fiber Optics, 1984, Analytical Chemistry, v.56, pp. 2199-2204.*

(Continued)

*Primary Examiner*—Layla G. Lauchman
*Assistant Examiner*—Bryan Giglio
(74) *Attorney, Agent, or Firm*—Bacon & Thomas, PLLC

(57) ABSTRACT

A process for measuring a point comprising at least one spectrometer and a measuring transducer connected thereto for picking up, processing and forwarding measuring signals from the spectrometer, the spectrometer being arranged in an armature for introduction into a process or a process fluid and the data produced by the spectrometer is used to control a process. The armature comprises a housing for receiving the spectrometer and for securing the armature to a process container containing process fluid and a sensor holder with an inbuilt sensor, interacting with the spectrometer and which is guided in an axially displaceable manner in the armature, whereby the sensor holder protrudes into the process fluid in an extended state.

13 Claims, 1 Drawing Sheet

U.S. PATENT DOCUMENTS

| | | | | |
|---|---|---|---|---|
| 4,599,975 | A | * | 7/1986 | Reeve et al. .................. 122/379 |
| 4,786,171 | A | * | 11/1988 | LeFebre et al. ............. 356/326 |
| 5,095,275 | A | * | 3/1992 | Dechene et al. ............ 324/454 |
| 5,453,832 | A | * | 9/1995 | Joyce .......................... 356/338 |
| 5,657,404 | A | * | 8/1997 | Buchanan et al. ............ 385/12 |
| 5,712,710 | A | * | 1/1998 | Karakus et al. ............. 356/436 |
| 5,995,916 | A | * | 11/1999 | Nixon et al. ................ 702/182 |
| 6,043,895 | A | * | 3/2000 | Masterson et al. .......... 356/436 |
| 6,128,079 | A | * | 10/2000 | McCloskey et al. ........ 356/338 |

FOREIGN PATENT DOCUMENTS

| DE | 199 48 990 A1 | 6/2000 |
|---|---|---|
| JP | 2000-206045 | 7/2000 |
| WO | WO96/12174 | 4/1996 |
| WO | WO 00/62028 | 10/2000 |
| WO | WO 01/46656 A1 | 6/2001 |

OTHER PUBLICATIONS

Scott Bump, Field Device Tool Technology: Open, Ineroperable Network Configuration, 2004, CIP Networks Conference & 10th Annual Meeting.*

Moore L K et al: "Miniature FlowProbe/sup TM/chemical sensor", Sensors and Actuators B38-39 (1997), Nr. 1-3, pp. 130-135.

* cited by examiner

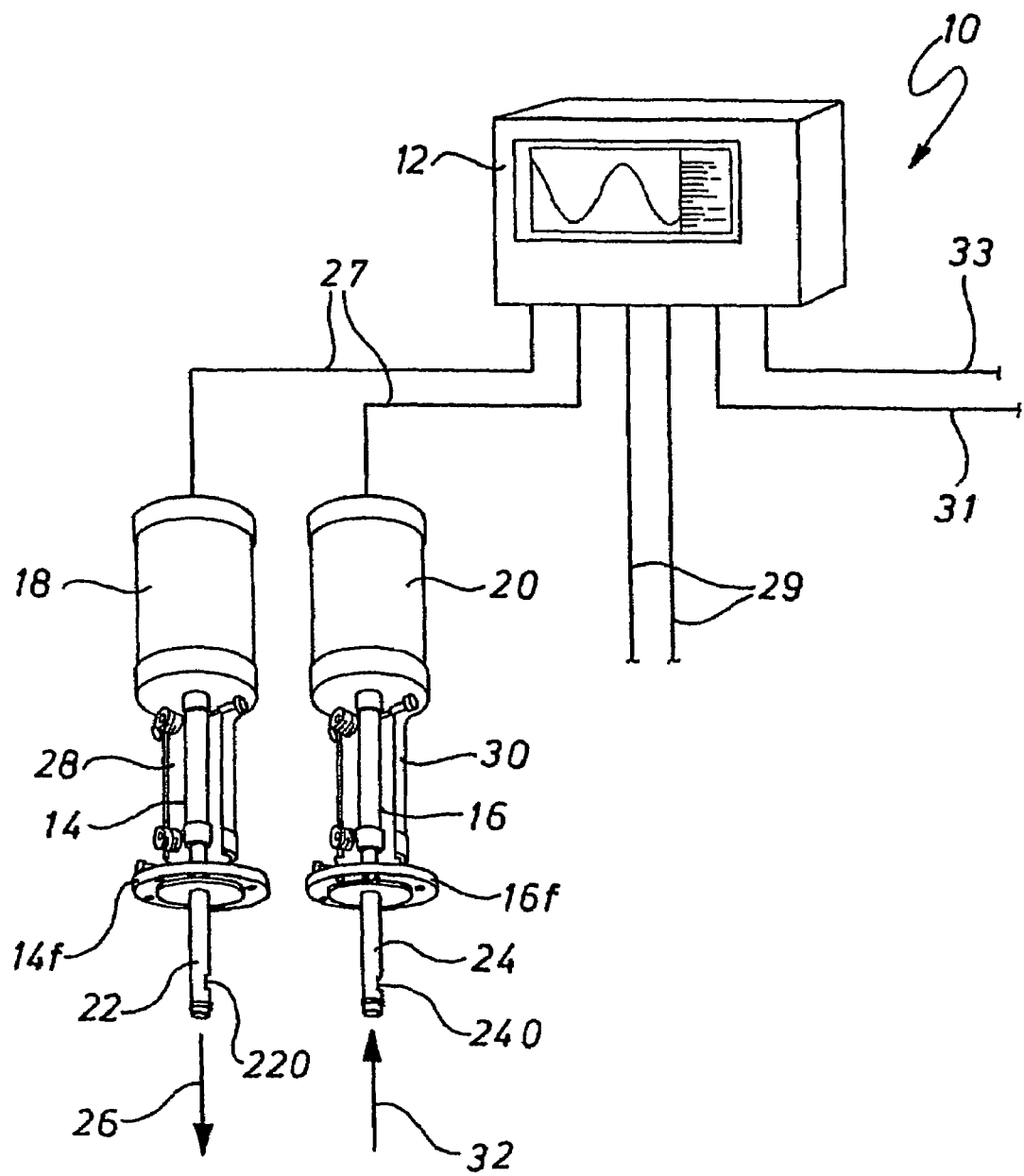

PROCESS MEASURING POINT

FIELD OF THE INVENTION

The invention concerns a process measuring point including a spectrometer and a measurement transmitter for accepting, processing and forwarding of measurement signals of the spectrometer.

BACKGROUND OF THE INVENTION

Spectroscopic investigations are performed in the framework of production processes of gases and liquids, for gaining information on the course of the production or the resulting material or the amount of the material which has resulted to this point in time, in order, for example, to be able to evaluate the already transpired conversion of two educts. It is known to take samples from the process, or from process fluids, as the case may be, and either place these directly in a spectroscopic apparatus in a suitable sample cuvette and then analyze, wherein then the analytical results are evaluated in a PC, or, alternatively, a sample can be drawn and this sample is then connected with a spectrometer by means of a optical waveguide, so that no direct filling of the liquid into the spectrometer need occur.

Problematic in both of these known procedures is the sample taking, since this involves a not insignificant time factor, i.e., on the one hand, time and personnel are needed for the sample taking, and, on the other hand, for continuous processes, there is always a delay between getting the results of the spectroscopy and the taking of the sample. I.e., a direct following of the process and, in the end, its control and regulation by means of spectroscopy is not possible with such off-line measurements.

Additionally, there is associated with the sample taking, along with the disadvantage of only discontinuous measurement, always the possibility of an endangering of health, since the person taking the sample can possibly come into contact with the fluid being taken as the sample. There is also the possibility of contaminating the production stream.

Particularly when measuring using optical waveguides, which couple the light into the liquid and then transmit back to the spectrometer, there is the additional disadvantage that such light guiding connections can not be realized over arbitrarily long distances and also are not usable for all spectral regions.

SUMMARY OF THE INVENTION

It is, consequently an object of the invention to provide a process measuring point having a spectrometer, which process measuring point enables a continuous measurement immediately in-situ and on-line.

The invention solves this object by providing a process measuring point including at least one spectrometer and a measurement transmitter connected therewith for accepting, processing and forwarding measurement signals of the spectrometer, wherein the spectrometer is arranged in an armature for insertion into a process or a process stream, i.e. a process fluid, and the data produced by the spectrometer serve for controlling the process, wherein the armature includes a housing for receiving the spectrometer and for fixing the armature at a process container containing the process or the process fluid, together with a sensor interacting with the spectrometer, which sensor is guided axially displaceably in the armature and wherein the sensor protrudes into the process, or process fluid, as the case may be, in the extended state.

Such a development of a process measuring point has the advantage that the spectrometer is not housed as a separate unit, but, instead, in an appropriate armature for use in conventional nozzles at appropriate measuring points on reactor containers and pipe lines. In this way, the sample taking burdened with not insignificant expenditures of time and the necessity of handling dangerous chemicals is avoided.

Additionally, a continuous measuring in the reactor itself is possible, and, thus also, the following of the conversion process and the direct control of the process on the basis of results obtained with the spectrometer.

By installation in the armature, use also in explosion-endangered areas becomes possible, for the spectrometer can be housed explosion-proof in the armature.

The otherwise usual connecting of spectrometers over long optical waveguides, which is not possible in every wavelength region, then can additionally be omitted. Only short optical paths to the medium need to be bridged, so that spectroscopy in the UV-region, the visible, the near infrared, and the middle infrared region becomes possible.

One or more spectrometers can be attached to the measurement transmitter. Additionally, the spectrometer can be connected with further sensors for determining other measurement parameters, such as, e.g., pH, conductivity, etc. The measurement transmitter can display, evaluate and, for instance, transmit the spectra over a process-compatible interface, such as, e.g., Profibus, Foundation, Fieldbus, Ethernet, to a process control point. The process control point cares then for the tracking of the corresponding process parameters.

As an example of a means for the joint usage of the identical operating software in the measurement transmitter and an externally connected PC, an identical Device Type Manager (DTM) can be used.

Optionally, for example, the use of a standard interface specification according to the FDT-concept (Field Device Tool) can be possible.

Moreover, the measurement transmitter can link the individual measurement parameters and perform calculations therewith or, as the case may be, undertake interactions with process adjusting members, e.g. process regulation and process control.

The spectrometer delivers then, especially, in-line and in-situ and/or continuous measurement signals.

It can be provided that the sensor includes a light guiding device, especially optical waveguides, which serve for optically coupling the spectrometer to the process and/or process stream. Other than is the case with prior, conventional connections with optical waveguides, these in the present case only have to bridge a short distance, in order to couple the light into the liquid and to transmit, in turn, the exiting light to the spectrometer.

The coupling can, in this case, occur e.g. by means of absorption or ATR (Attenuated Total Reflection), both being usual methods for coupling light into a liquid or a gas. There are, however, also other conceivable optical couplings.

The process spectrometer can, for example, be a grating spectrometer, an ATOF-crystal spectrometer, or others.

The connecting of the spectrometer to the measurement transmitter can be either electrical, e.g. by way of a digital or analog connection, or optical, for example by means of digital data transmission through optical waveguides.

The applied spectrometer can be a usual commercial spectrometer, ready for application for various wavelength regions. The spectrometer can be exchangeable within the armature, and the armature can be a reciprocating armature.

The complete unit in the armature, including sensors, namely especially the optical waveguides, and the spectrometer itself, can be exchanged, when, for example, measurements are to be in other wavelength ranges. In this connection, it can be provided that the sensor, whose extended position is in the process or process stream in its measurement location, is in a cleaning position and/or calibration position in its retracted position. In this connection, it can be provided that the measurement transmitter controls the reciprocating armature for this, e.g. in order to perform the cleaning or calibration of the spectrometer. This can occur under program control over the course of time event-controlled from the outside or controlled by the measurement signal itself. In this way, for example, an automatic cleaning upon detection of dirtying or an automatic calibration with a calibration solution is made possible, when, e.g., the measurement values seem implausible.

The sensor installed in a sensor holder is, for this purpose, brought out of the process medium in the axial direction along a guiding device in the armature and drawn into the armature to a cleaning- or calibrating-position, in which the appropriate treatment can be performed. The sensor can then be lowered back into the process medium.

Additional advantages and features of the invention will become evident from the remainder of the application. In the following, an embodiment of the invention will be explained in more detail on the basis of a drawing.

BRIEF DESCRIPTION OF THE DRAWING

The sole FIGURE of the drawing shows a measuring point of the invention for a manufacturing process of the chemical or petrochemical industry.

DETAILED DESCRIPTION

The process measuring point is referenced therein in its entirety with the reference character 10. The process measuring point includes a measurement transmitter 12, as well as two armatures 14 and 16. Each of the armatures 14 and 16 contains a process spectrometer(not shown) located in its respective housing 18, 20.

The spectrometers are usual, commercial devices, which are designed for certain wavelength ranges. Both spectrometers here are of explosion-proof design.

The armatures 14, 16 additionally each include a sensor holder 22, 24, displaceable in the axial direction (direction of arrow 26), for receiving the sensors.

The FIGURE shows the sensor holders 22, 24 in their extended, measuring position, in which they protrude into the process fluid, which is located, for example, in a chemical reactor (not shown). For cleaning the sensor openings 220, 240 and calibrating of the sensor, the sensor holder 22, 24 can be retracted into the housing section 28, 30 of the armatures 14, 16, so that the sensor holder no longer protrudes into the process fluid. It can, in this connection, be provided that the exit opening for the sensor holder 22, 24 is closed, so that the armature 14, 16 is no longer in contact with the fluid.

Within the sensor holder 22, 24 are optical waveguides, which couple the light into the fluid by means of the absorption method. Measurement occurs in this instance within the measurement openings 220, 240, which have fluid flowing through them.

The measurement signals of these two probes are then forwarded to the measurement transmitter 12 over lines 27. The measurement transmitter 12 functions as a multiparameter measurement transmitter and accepts, processes and forwards the measurement signals of the spectrometers.

Along with the measurement signals of the spectrometers, measurement transmitter 12 receives on lines 29 measurement signals of other sensors, such as, for example, signals for pH or conductivity.

The won data is transmitted by the measurement transmitter 12 over an Internet connection 31 or a Profibus connection 33 to a process control system, which handles the control of the production process.

The measurement transmitter 12 can additionally link individual measurement parameters, perform calculations therewith and care for interactions with process adjusting members.

Moreover, the measurement transmitter 12 can control the reciprocating armatures 14, 16, in order to accomplish cleaning and calibration of the spectrometer.

As an example of a means for the joint usage of the identical operating software in the measurement transmitter and an externally connected PC, an identical Device Type Manager (DTM) can be used.

Optionally, for example, the use of a standard interface specification according to the FDT-concept (Field Device Tool) is provided for.

When the measurement transmitter recognizes, or determines, a need for cleaning, because the calibration is no longer correct, the sensor holders 22, 24 are retracted in the direction of arrow 32 into the housing sections 28, 30 of the armatures 14, 16. The openings through which the sensor holders 22, 24 are retracted are then closed. There follows a calibration or cleaning of the sensors within the armature sections 28, 30. Following calibration or cleaning, they are then coupled back into the process in the direction of arrow 26.

The connection of the spectrometers with the measurement transmitter 12 over the lines 27 occurs here over analog electrical lines.

The armatures 14, 16 are attached with their flanges 14f, 16f, respectively, to the pipe lines and to associated nozzles of the same, or to nozzles in a reactor, as the case may be, and, in this way, securely located.

In this manner, a continuous, in-situ measurement of spectra of chemical products can be accomplished, and the production process can be monitored therewith. A time-consuming and, for the people involved therewith, dangerous sample-taking, which, moreover, does not enable a continuous process tracking, can, consequently, be avoided. In this way, by continuous checking of the spectra, production processes can be arranged more economically and, in some cases, the production time can be decreased, since it can already be recognized at an early time that a sufficient yield of a substance is present.

The invention claimed is:
1. Process measuring point, comprising:
at least one spectrometer which produces data serving to control a process;
a measurement transmitter connected with said at least one spectrometer for accepting, processing and forwarding measurement signals of said at least one spectrometer;
an armature for insertion into a process fluid, said armature having a housing for receiving a first one of said at least one spectrometer and for fixing said armature at a process container containing the process fluid, and a sensor holder with installed sensor interacting with said first one of said at least one spectrometer, which sensor is guided axially displaceably in said armature; and said sensor holder protrudes into the process fluid in an extended state wherein said sensor holder is located in a retracted position and cleaned or calibrated, while in the retracted position.

2. The process measuring point as claimed in claim 1, wherein each spectrometer delivers one of: in-situ, in-line and/or continuous measurement signals.

3. The process measuring point as claimed in claim 1, wherein said sensor holder includes a light-guiding device, which serve for the optical coupling of the spectrometer to the process fluid.

4. The process measuring point as claimed in claim 1, wherein said at least one spectrometer is one of an ATOF-crystal spectrometer and a grating spectrometer.

5. The process measuring point as claimed in claim 3, wherein said optical coupling to the process occurs by one of: absorption and ATR.

6. The process measuring point as claimed in claim 1, wherein each spectrometer is connected electrically or optically with the measurement transmitter.

7. The process measuring point as claimed in claim 1, wherein said first one of said at least one spectrometer is exchangeable in the armature.

8. The process measuring point as claimed in claim 1, wherein the cleaning or calibration is controlled by said measurement transmitter.

9. The process measuring point as claimed in claim 1, wherein said measurement transmitter is connected with a process control point.

10. The process measuring point as claimed in claim 1, wherein a plurality of sensors are connectable to said measurement transmitter.

11. The process measuring point as claimed in claim 1, wherein the use of a same Device Type Manager by both said measurement transmitter and an externally connected PC serves as a means for the joint use of an identical operating software by both.

12. The process measuring point as claimed in claim 1, wherein said measurement transmitter is connected with an external PC over an interface based on a Field Device Tool-concept.

13. The process measuring point as claimed in claim 3, wherein said light-guiding device comprises an optical waveguide.

* * * * *